(12) United States Patent
Wang et al.

(10) Patent No.: US 12,435,962 B2
(45) Date of Patent: Oct. 7, 2025

(54) INTEGRAL FINGER BRAKE OPENING

(71) Applicant: Stanley Black & Decker, Inc., New Britain, CT (US)

(72) Inventors: Kuan Chieh Wang, Taichung (TW); Hsuan Sung Liu, Taichung (TW); Somen Jaiswal, Danbury, CT (US); Antony Orsini, Cheshire, CT (US); Tylan A. Tschopp, Columbus, OH (US)

(73) Assignee: Stanley Black & Decker, Inc., New Britain, CT (US)

( * ) Notice: Subject to any disclaimer, the term of this patent is extended or adjusted under 35 U.S.C. 154(b) by 0 days.

(21) Appl. No.: 18/721,494

(22) PCT Filed: Dec. 20, 2022

(86) PCT No.: PCT/US2022/053463
§ 371 (c)(1),
(2) Date: Jun. 18, 2024

(87) PCT Pub. No.: WO2023/122061
PCT Pub. Date: Jun. 29, 2023

(65) Prior Publication Data
US 2024/0418493 A1 Dec. 19, 2024

Related U.S. Application Data

(60) Provisional application No. 63/292,410, filed on Dec. 21, 2021.

(51) Int. Cl.
*G01B 3/1046* (2020.01)
*G01B 3/1005* (2020.01)
(Continued)

(52) U.S. Cl.
CPC ......... *G01B 3/1046* (2020.01); *G01B 3/1005* (2013.01); *G01B 3/1007* (2020.01); *G01B 3/1061* (2013.01); *G01B 2003/1015* (2013.01)

(58) Field of Classification Search
CPC .. G01B 3/1046; G01B 3/1005; G01B 3/1007; G01B 3/1061; G01B 2003/1015
See application file for complete search history.

(56) References Cited

U.S. PATENT DOCUMENTS

| 397,198 A | 2/1889 | Meisselbach |
| 1,986,551 A | 1/1935 | Anderson |

(Continued)

FOREIGN PATENT DOCUMENTS

| DE | 20313793 U1 | 11/2003 |
| EP | 0932016 A2 | 7/1999 |

(Continued)

OTHER PUBLICATIONS

Written Opinion of the International Searching Authority, dated Jun. 19, 2023, for corresponding PCT Application No. PCT/US2022/053463.

*Primary Examiner* — Yaritza Guadalupe-McCall
(74) *Attorney, Agent, or Firm* — Gabriel A. Haboubi

(57) ABSTRACT

A tape measure includes a housing with first and second housing portions; a reel configured to be secured between the first and second housing portions, the reel containing a tape blade wound thereon and partially extending therefrom terminating in a hook portion; and an integral component coupled to the first and second housing portions, including an aperture defining a finger brake, the finger brake exposing the tape blade for engagement by a user. The tape blade is biased to retract into the housing, winding around the reel, such that in a fully retracted position the hook portion abuts the portion of the mouth of the tape measure. In an extended position the tape blade is unwound from the reel such that the hook extends away from the integral component. An integral component including an aperture defining a tape measure mouth and a light emitter receiving slot is also disclosed.

16 Claims, 13 Drawing Sheets

(51) Int. Cl.
    *G01B 3/1007*     (2020.01)
    *G01B 3/1061*     (2020.01)

(56) References Cited

U.S. PATENT DOCUMENTS

| | | | |
|---|---|---|---|
| 2,016,483 | A | 10/1935 | Carlson |
| 2,207,277 | A | 7/1940 | Volz |
| 2,505,653 | A | 4/1950 | Shillman |
| 4,012,010 | A | 3/1977 | Friedman |
| 4,189,107 | A | 2/1980 | Quenot et al. |
| 5,657,551 | A | 8/1997 | Lin |
| 6,161,299 | A | 12/2000 | Lin |
| 6,167,635 | B1 | 1/2001 | Lin |
| 6,256,901 | B1 | 7/2001 | Lin |
| 6,276,071 | B1 | 8/2001 | Khachatoorian |
| 6,405,451 | B1 | 6/2002 | Hsu |
| 6,691,426 | B1 | 2/2004 | Lee et al. |
| 7,174,656 | B1 * | 2/2007 | Smith .......... G01B 3/1084 33/769 |
| 7,377,050 | B2 * | 5/2008 | Shute .......... G01B 3/1041 33/761 |
| 7,555,845 | B2 | 7/2009 | Critelli et al. |
| 7,584,549 | B2 | 9/2009 | Lee et al. |
| 7,749,236 | B2 | 7/2010 | Oberlaender et al. |
| 8,806,770 | B2 | 8/2014 | Steele et al. |
| 8,863,399 | B2 | 10/2014 | Steele et al. |
| 8,898,922 | B2 * | 12/2014 | Bridges .......... G01B 3/1005 33/767 |
| D733,597 | S | 7/2015 | Hyma et al. |
| 9,080,849 | B2 | 7/2015 | Steele et al. |
| 9,322,628 | B2 | 4/2016 | Burch et al. |
| 9,441,932 | B2 * | 9/2016 | Bridges .......... G01B 3/1005 |
| 9,574,862 | B2 | 2/2017 | McCallum |
| 11,668,551 | B2 * | 6/2023 | Kang .......... G01B 3/1048 33/761 |
| 2003/0019116 | A1 | 1/2003 | DeWall |
| 2004/0035017 | A1 | 2/2004 | Yang |
| 2007/0056182 | A1 * | 3/2007 | Di Bitonto .......... G01B 3/1005 33/767 |
| 2007/0227029 | A1 * | 10/2007 | Shute .......... G01B 3/1041 33/761 |
| 2010/0212175 | A1 | 8/2010 | Choi |
| 2010/0299948 | A1 | 12/2010 | Choi |
| 2013/0133215 | A1 * | 5/2013 | Bridges .......... G01B 3/1005 33/701 |
| 2015/0040416 | A1 * | 2/2015 | Bridges .......... G01B 3/1005 33/701 |
| 2017/0292821 | A1 * | 10/2017 | DeLeo .......... G01B 3/1005 |
| 2025/0076018 | A1 * | 3/2025 | Herritz .......... G01B 3/1005 |

FOREIGN PATENT DOCUMENTS

| | | |
|---|---|---|
| WO | WO-2023122061 A2 * | 6/2023 |
| WO | WO-2023212195 A1 * | 11/2023 |

* cited by examiner

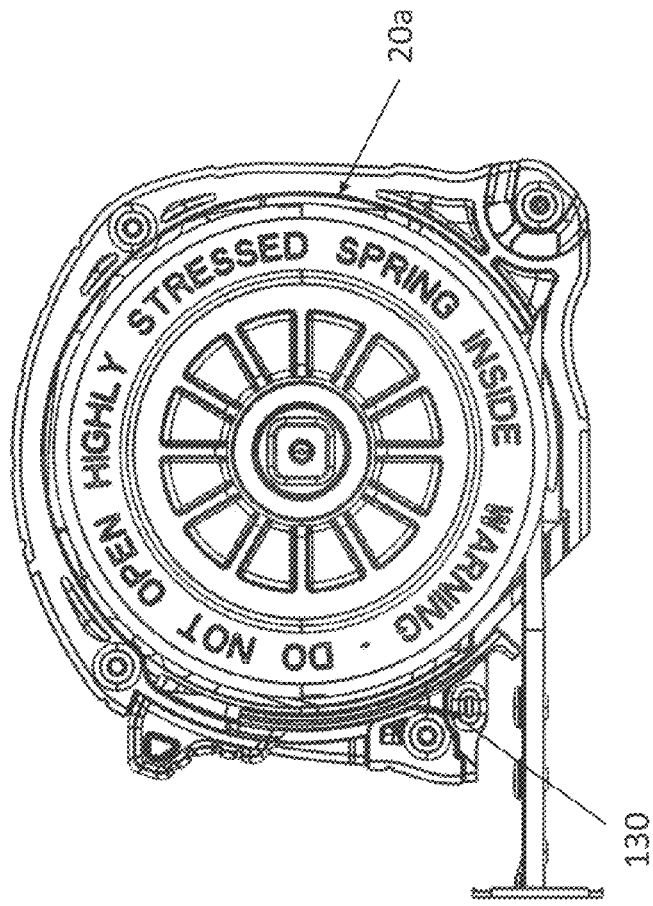
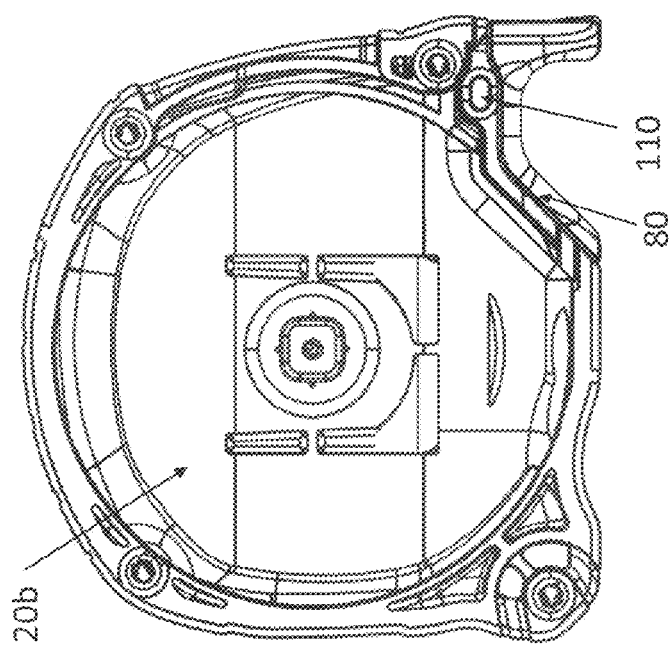
FIG. 4

US 12,435,962 B2

INTEGRAL FINGER BRAKE OPENING

CROSS-REFERENCE TO RELATED APPLICATIONS

This application is a national stage filing under 35 U.S.C. § 371 of International Application PCT/US2022/053463 filed on Dec. 20, 2022, which claims the benefit of U.S. Provisional Application No. 63/292,410 filed on Dec. 21, 2021, the entire contents of each of which are hereby incorporated herein by reference.

FIELD OF THE INVENTION

The present invention relates to tape measures of the type comprising a housing containing a coiled elongate flexible measuring tape which is extendable from, and automatically retractable back into, the housing.

BACKGROUND

Conventional finger brake opening form a weak point on a tape measure housing due to the lack of structure thereat. As such, dropping a tape measure at the juncture between a wear plate and a finger brake opening may cause breakage at the juncture due to transmission of forces pushing the wear plate into either the finger brake opening or the tape mouth opening. Among other things, the present disclosure improves upon known finger brakes on tape measures and known wear plates on tape measures.

SUMMARY OF THE INVENTION

According to one aspect of this disclosure, a tape measure includes a housing comprising a first housing portion and a second housing portion; a reel configured to be secured between the first housing portion and the second housing portion, the reel containing a tape blade wound thereon and partially extending therefrom, the tape blade terminating in a hook portion; and an integral component coupled to the first housing portion and the second housing portion, the integral component including an aperture defining a finger brake, the finger brake exposing the tape blade for engagement by a user. The tape blade is biased to retract into the housing and wind around the reel, such that in a fully retracted position the hook portion abuts the portion of the mouth of the tape measure. In an extended position the tape blade is unwound from the reel such that the hook extends away from the integral component.

According to another embodiment, a tape measure includes a housing comprising a first housing portion and a second housing portion; a reel configured to be secured between the first housing portion and the second housing portion, the reel containing a tape blade wound thereon and partially extending therefrom, the tape blade terminating in a hook portion; and an integral component coupled to the first housing portion and the second housing portion, the integral component including an aperture defining a mouth of the tape measure and includes a first slot shaped to receive a light emitter. The tape blade is biased to retract into the housing and wind around the reel, such that in a fully retracted position the hook portion abuts the portion of a mouth of the tape measure. In an extended position the tape blade is unwound from the reel such that the hook extends away from the integral component.

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the invention, the structural components illustrated herein are drawn to scale. It is to be expressly understood, however, that the drawings are for the purpose of illustration and description only, and are not intended as a definition of the limits of the invention. In addition, it should be appreciated that structural features shown or described in any one embodiment herein can be used in other embodiments as well. As used in the specification and in the claims, the singular form of "a", "an", and "the" include plural referents unless the context clearly dictates otherwise.

BRIEF DESCRIPTION OF THE DRAWINGS

Features of tape measures in accordance with one or more embodiments are shown in the drawings, in which like reference numerals designate like elements. The drawings form part of this original disclosure in which:

FIG. 4 illustrates an exploded side view of the embodiment of the tape measure of FIG. 1 with the component and a housing side detached from the remainder of the tape measure;

DETAILED DESCRIPTION OF THE ILLUSTRATED EMBODIMENT(S)

An aspect of this invention may comprise a tape measure that includes a finger brake opening that facilitates a user pressing on a portion of the blade through an opening in a housing of the tape measure. In particular, the finger brake opening may be formed from a single component that surrounds the opening in the housing and forms a seamless region thereat, extending between housing sides that otherwise have a seam therebetween. In some embodiments, the component may further define a wear plate that supports the mouth of the tape measure from which the measuring tape extends and against which a hook of the tape retracts.

Figure 1:
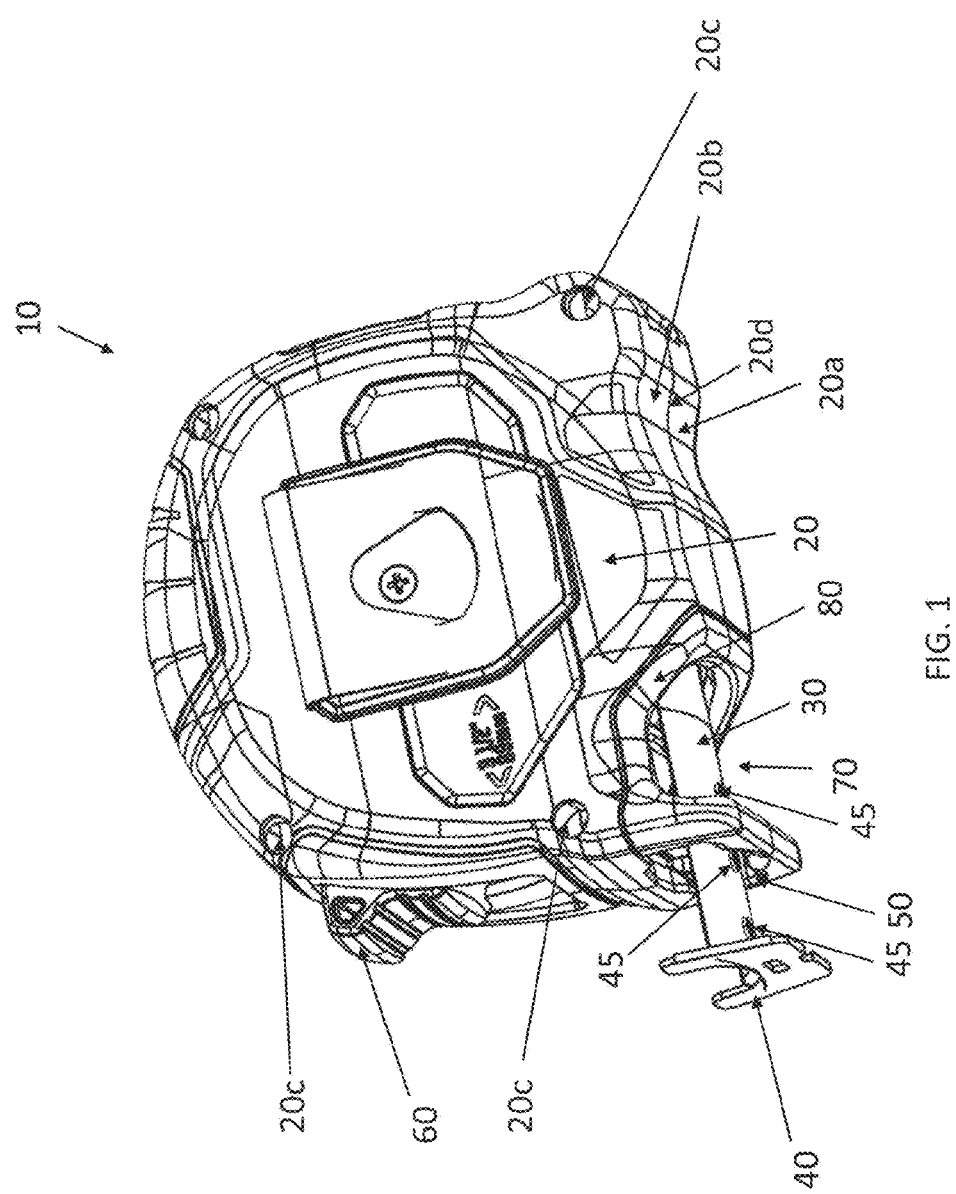
FIG. 1 illustrates a perspective view of an embodiment of a tape measure of the present disclosure, having a component defining and surround a finger brake opening thereof.

As shown in FIG. 1, a tape measure 10 may include a housing 20 containing a tape blade 30 which may terminate in a tape hook 40. The tape hook 40 may be secured to the tape blade 30 by one or more rivets 45 in some embodiments. The housing 20 may be made of any appropriate material, and typically may be formed from plastic, such as housing sides 20a and 20b that are joined together by fasteners 20c, such that the housing sides 20a and 20b have a defined seam 20d therebetween. The tape blade 30 may extend from and retract into a mouth 50 of the tape measure. The tape blade 30 may be spring or otherwise automatically retractable into the housing 20. The tape hook 40 may prevent the tape blade 30 from being pulled completely into the housing 20, by abutting against surrounding structure of the mouth 50, as described in greater detail below. A locking mechanism, such as a slide lock 60, may also selectively clamp the tape blade 30, such as into an extended position protruding from the mouth 50. As further shown in the illustrated embodiment, a finger brake opening 70 may expose a generally flat expanse of the tape blade 30 and facilitate a user using their finger to press the blade 30 against the housing 20 or other internal features of the tape measure 10, so as to prevent automatic retraction of the tape blade 30 into the housing 20 without separate actuation of the slide lock 60 or similar locking mechanism.

It is an aspect of the present disclosure that the structure surrounding the finger brake opening 70 may be formed from a single piece of material. In some embodiments, the structure may further define at least a portion of the mouth 50. In some embodiments, it may be understood that a portion of the mouth 50 may be reinforced to act as a wear plate, which may prevent excessive wear to the mouth 50 or to the hook 40 as the hook 40 repeatedly is biased into the mouth 50 when the blade 30 is automatically retracted. As such, and as seen in greater detail in FIG. 2, a component 80 may be configured to define and surround the finger brake opening 70. In an embodiment the component 80 may include both a mouth portion 90 and a finger brake portion 100. The entirety of the component 80 may be formed from a single piece of material. For example, in an embodiment, the component 80 may be formed of plastic, or may be formed of metal, such as a cast, stamped, or molded metal, a 3D printed metal, or formed in other such processes. In some such embodiments the component 80 may be formed of zinc.

Figure 2:
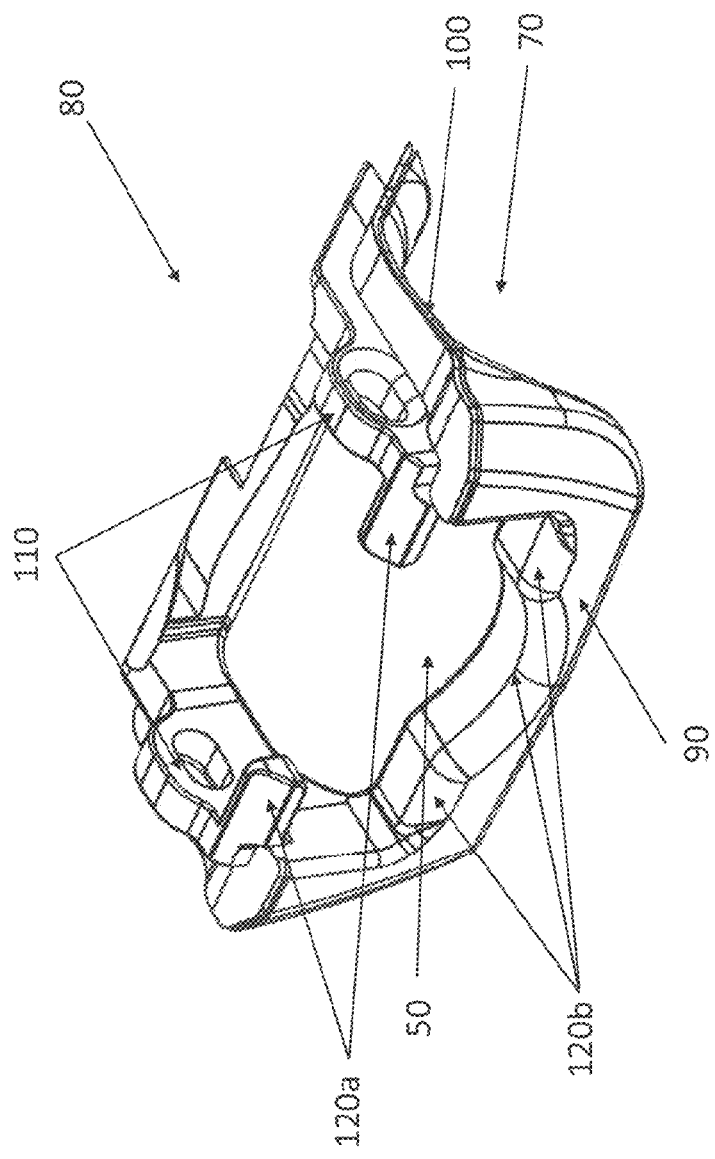
FIG. 2 depicts an isolated perspective view of the embodiment of the component of FIG. 1.

In some embodiments, the component 80 may include one or more mounting features 110 which may facilitate holding the component 80 in the housing 20 of the tape measure 10, as discussed in greater detail below with reference to FIG. 3. In some embodiments the component 80 may include blade guide features which may limit movement of the blade 30, so as to prevent rubbing of the blade 30 against the housing 20 as the blade 30 retracts. For example, the component 80 may include blade guide features 120a that extend over the top of the mouth portion 90 so as to define the mouth 50 therebetween. As shown in FIG. 2, in some embodiments the blade guide features 120a extending over the top of the mouth portion 90 may not connect with one another, such that a portion of the housing 20 further defines the mouth 50. Further blade guide features 120b may be formed on the mouth portion 90, which may match and support a contour of the blade 30, and/or may be configured to provide impact support strength to the component 80. In some embodiments the blade guide features 120b may define raised portions to support the blade, and a recess for receiving the rivets 45 securing the hook 40 to the blade 30.

It may be appreciated that the mouth portion 90 may define at least the bottom of the mouth 50. In some embodiments the mouth portion 90 may define sides of the mouth 50 and/or may define the top of the mouth 50, either alone, or in combination with portions of the housing 20. As such, in some embodiments the blade guide features 120a and/or the blade guide features 120b may together be formed as part of the mouth portion 90, integral to the component 80, and the mouth portion 90 may alone define top and bottom surfaces surrounding the mouth 50, integral to one another in some embodiments. In some embodiments the mouth portion 90 may define the entirety of the mouth 50, such as by forming a perimeter of the mouth 50. In the same or other embodiments, the finger brake portion 100 may define the entirety of the finger brake opening 70, such as by forming a perimeter of the finger brake opening 70.

Figure 3:
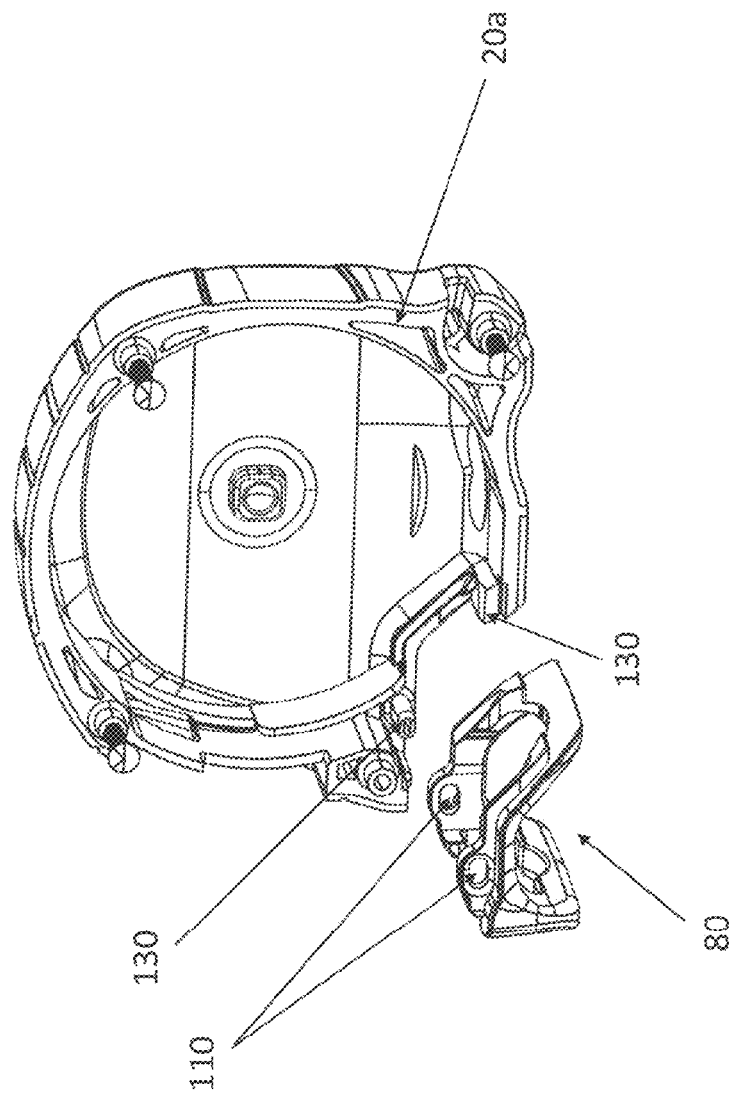
FIG. 3 illustrates a perspective view of an exploded subassembly of the embodiment of component of FIG. 2 as it may engage a housing side of the tape measure of FIG. 1 during assembly.

As seen in the view of FIG. 3, as well as in FIG. 4 in an embodiment the component 80 may be inserted into the housing 20 so that it may extend across the housing sides 20a and 20b, and as such may create a seamless region at the finger brake opening 70, and in some embodiments further at the mouth 50, in the regions of the housing 20 thereat. As seen in FIG. 3, the housing sides 20a and (although omitted from view, 20b) may include reciprocal mounting features 130, which may engage with and receive the mounting features 110 of the component 80, so as to hold the component 80 sandwiched between the housing sides 20a and 20b, and as such fix the component 80 into the housing as the tape measure 10 is assembled. While in the illustrated embodiment the component 80 is held into the housing 20 by engagement of mounting features 110 and mounting features 130, in other embodiments fasteners, adhesives, or other appropriate mechanisms may hold the component into the housing to interrupt a seam formed between the housing side 20a and the housing side 20b, not only at the mouth 50, but across the entirety of the finger brake opening 70.

Figure 5:
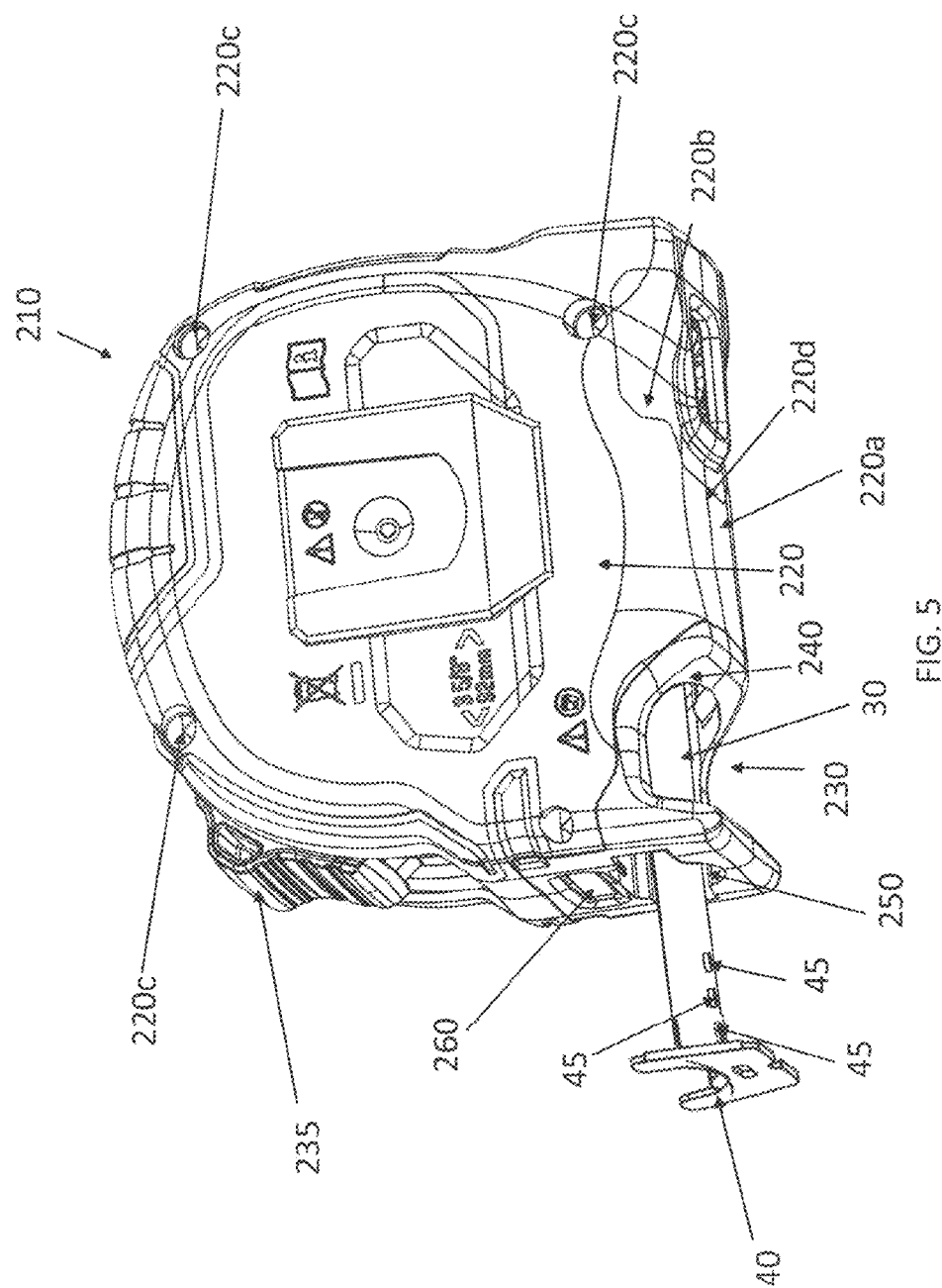
FIG. 5 illustrates a perspective view of another embodiment of a tape measure of the present disclosure, including a component defining and surrounding a finger brake opening thereof and providing a receptacle for a light.

As indicated above, in some embodiments the component 80 may form a perimeter of the mouth 90, and in some embodiments the component 80 may form a perimeter of the finger brake opening 70. FIG. 5 depicts an example embodying both, where a tape measure 210 has a housing 220 formed from a housing side 220a and a housing side 220b secured together (e.g., with fasteners 220c) creating a defined seam 220d therebetween. Similar to the tape measure 10, the tape measure 210 may include a tape blade 30 that terminates in a tape hook 40 that is secured to the tape blade 30 (e.g., by rivets 45). The tape measure 210 may include a finger brake opening 230 to allow a user to manually press their finger onto the blade 30, clamping the blade 30 between their finger and the interior of the tape measure 210 to slow or prevent movement thereof independently of a slide-lock 235 (which may be similar to the slide-lock 60 in some embodiments).

As further shown in FIG. 5, a component 240, which may be generally similar to the component 80 described above, except as otherwise noted herein, may define both the tape measure opening 230 and a mouth 250 of the tape measure 210. As discussed in greater detail below, the component 240 may define a perimeter of the mouth 250, and may define a perimeter of the tape measure opening 230. In some embodiments, such as that shown, the tape measure 210 may further include a light 260, which may be at least partially integrated into the component 240.

Figure 6A:
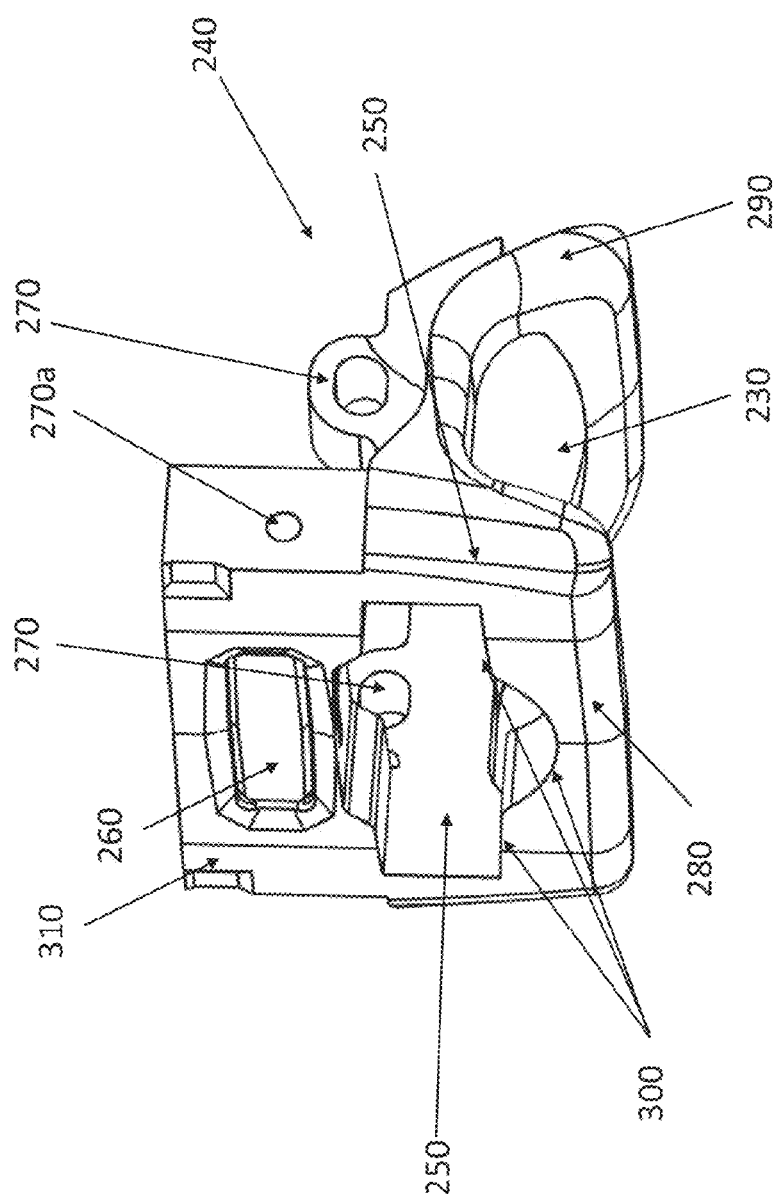
FIG. 6A illustrates a perspective view of a subassembly of the component of FIG. 5 alongside a light mounting therein.
Figure 6B:
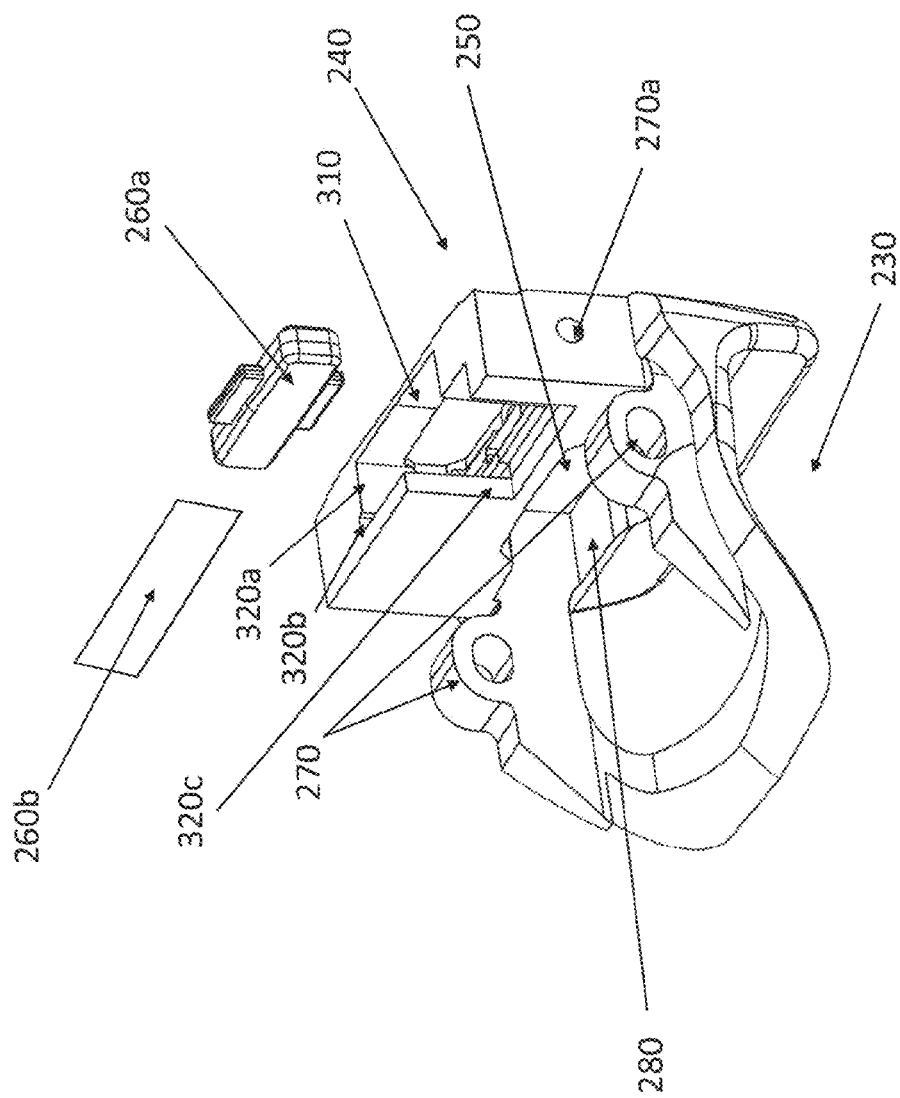
FIG. 6B illustrates an exploded perspective view of the subassembly of FIG. 6A, with the component in isolation and a lens for the light positioned for insertion therein.

Other aspects of the component 240 may be appreciated in the isolated and subassembly views of FIG. 6A and FIG. 6B. As shown in FIG. 6A, the component 240 may include mounting features 270 to secure and support the component in the housing 220. In some embodiments the mounting features 270 may be similar to the mounting features 110. In some embodiments, the mounting features 270 may include one or more screw holes 270a (which may be pre-tapped holes to receive machine screws, for instance), or may be configured to receive a self-tapping screw to create screw holes 270a. It may be appreciated that pre-formed screw holes 270a may facilitate ease of case alignment and strengthen coupling between the component 240 and the housing 220. In some embodiments, one or more screw holes 270a may terminate in the component 240, which may deter the component 240 twisting or bending relative to the housing 220 in some embodiments. In the illustrated embodiment, screw holes 270a may be provided on opposing sides of the component 240, which may allow for the component 240 to be fastened to each of the case halves 220a and 220b, which may increase durability of the tape measure 210 by limiting ability for the component 240 to separate from the housing 220 if the tape measure 210 is dropped.

As shown, in some embodiments the component 240 may also include a mouth portion 280 and a finger brake portion 290. Similar to the mouth portion 90, the mouth portion 280 may include blade guide features 300, which may be similar to blade guide features 120 discussed above. For example, the blade guide features 300 may comprise protrusions surrounding a recess, providing clearance for rivets 45 when the blade is received in the housing 220, analogous to the features 120b.

As may be appreciated more clearly with reference to FIG. 6B, features of the light 260 may be received in the component 240 in some embodiments. For example, the light 260 may include a lens 260a that directs light emitted by a light emitter 260b. In some embodiments the component 240 may be formed from a transparent or translucent material (e.g., transparent or translucent plastic), and may define an integral lens 260a through which the light emitter 260b shines. In the illustrated embodiment, the light emitter 260b comprises a light electronics board, such as a printed circuit board (PCB) having a light emitting diode (LED) thereon, positioned to be shone through the lens 260a. It may be appreciated that the lens 260a may direct the light from the light emitter 260b downward in the direction of the tape blade 30, or may direct the light straight outward to illuminate a workspace in various embodiments. In an embodiment, the lens 260a may diffuse the light, while in some embodiments the lens 260a may comprise generally clear (transparent or translucent) glass or plastic so as to act as a generally transparent cover for the light emitter 260b. As shown in the illustrated embodiment, the component 240 may include a light portion 310 alongside the mouth portion 280 (e.g., integrally formed above the aperture in the component 280 defining the mouth 250). In some such embodiments, the light portion 310 may include slots 320 to receive components of the light 260, such as a slot 320a to receive the lens 260a, and a slot 320b to receive the light emitter 260b.

Figure 7:
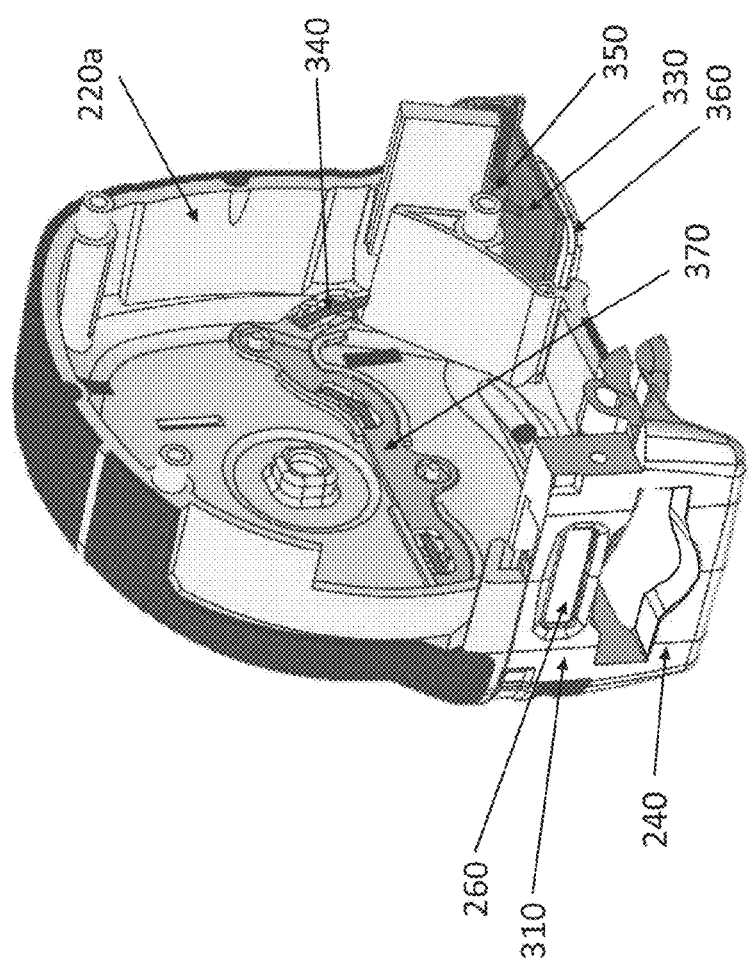
FIG. 7 illustrates an isolated side view of a subassembly of the tape measure of FIG. 5, showing the component, a housing portion, and a wiring channel therein.
Figure 8:
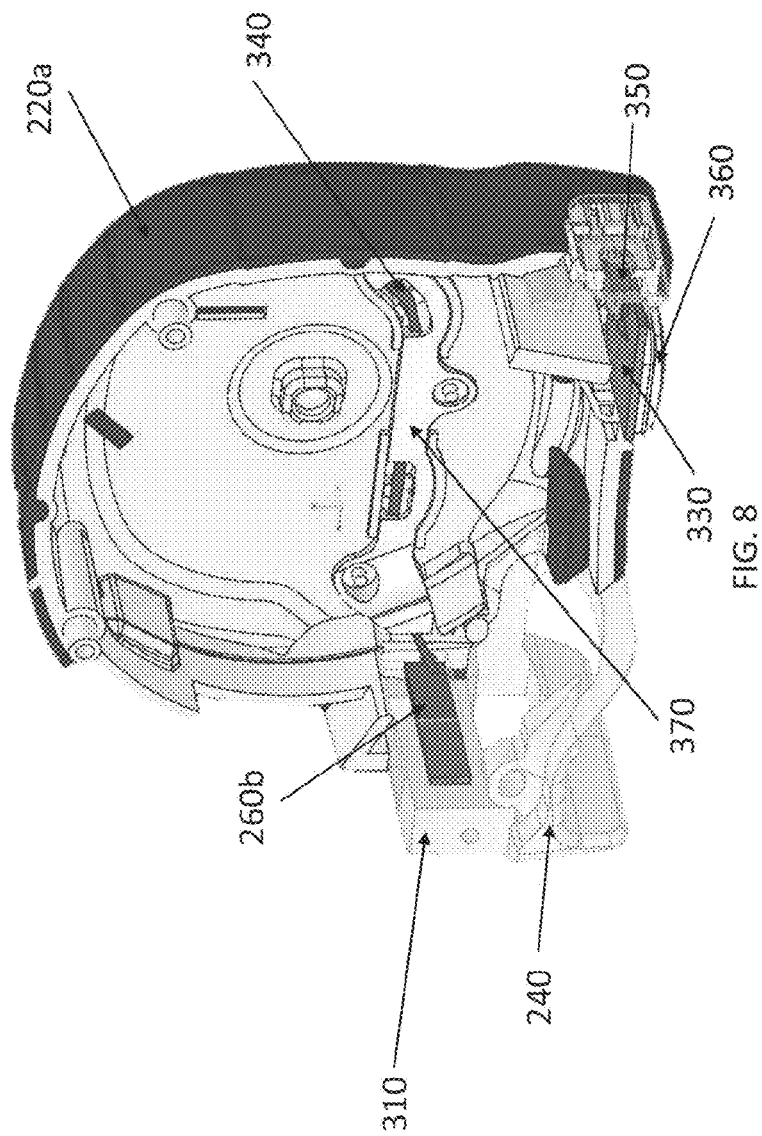
FIG. 8 shows another view of the subassembly of FIG. 7, with the component transparent to show a light electronics board therein.
Figure 9:
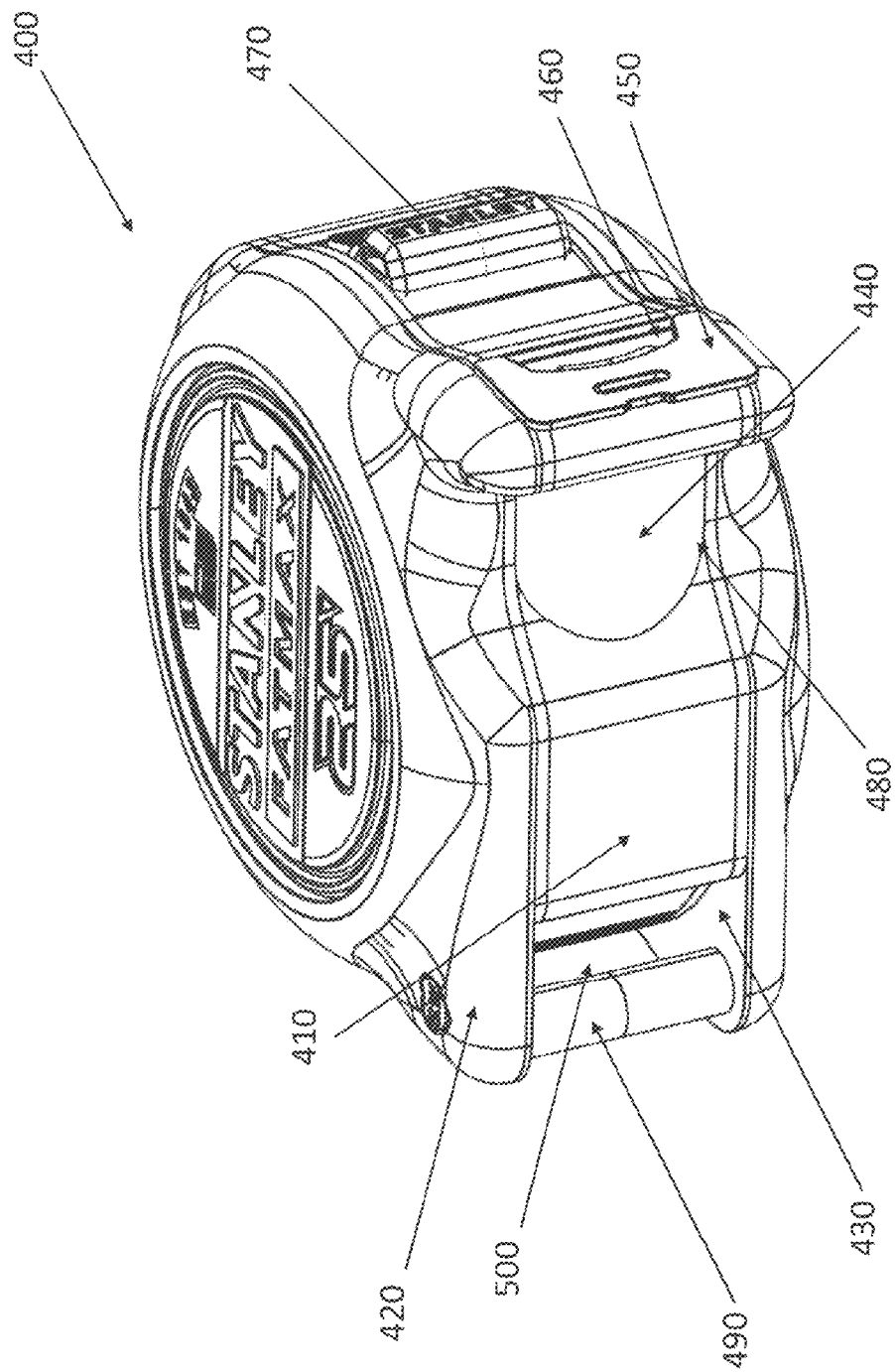
FIG. 9 illustrates a bottom perspective view of another embodiment of a tape measure of the present disclosure, including a central integral housing component defining a finger brake, sandwiched between opposing housing sides.
Figure 10:
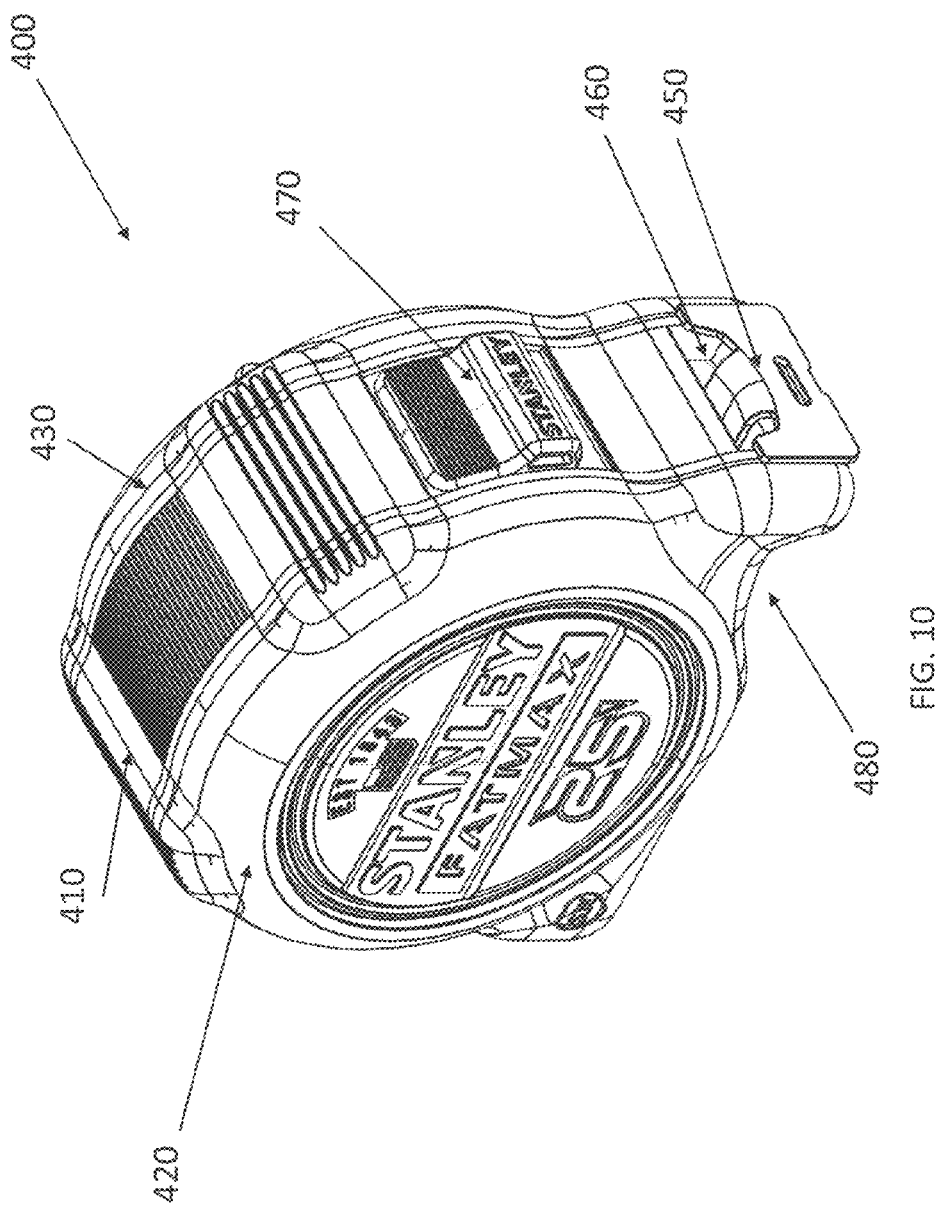
FIG. 10 illustrates a top perspective view of the tape measure of FIG. 9.

As discussed below, in some embodiments an aperture 320c in the light portion 310 facing an interior of the housing 220 may facilitate wiring between a battery (e.g., compartment for replicable batteries, or a rechargeable battery) and the light 260. FIGS. 7A and 7B illustrate an embodiment of an interior of the housing 220, namely housing side 220a shown with the component 240 and the light 260 mounted thereon. As shown, in an embodiment, the light 260 may be coupled to a battery 330 through wiring 340. In some embodiments, the battery 330 is rechargeable through a charging port 350 (e.g., a USB charging port).

In some embodiments, the light 260 may be activated through a switch 350 that may be located adjacent to the battery 330. As such, in some embodiments, the wiring 340 may lead between the light 260 and the switch 350, while in other embodiments the switch may be housed in the light portion 310 (e.g., the light emitter 260b is activated by pressing on the lens 260a, or through a switch protruding through the light portion 310 for example). In some embodiments the light emitter 260b may be activated through extension or retraction of the tape blade 30 (e.g., on a timer that is started or extended through motion of the blade 30), and the switch 360 may be a rotary switch or rotary detector. In other embodiments, a sensed disconnection between the component 250 and the hook 40 (e.g., magnetic sensor, conductive sensor, motion sensor) could trigger activation of the light emitter 260b, either for a predetermined amount of time or until the hook 40 is returned to the mouth 250. Regardless, in embodiments where the wiring 340 must be routed from a portion of the housing 220 adjacent to the mouth 250 and a portion of the housing 220 distal from the mouth 250, a wiring rail 370 may be configured to engage and hold the wiring 340 so that it does not contact or become worn by movement of a tape reel housing the tape blade 30, a spring motor within, or other rotatable components of the tape measure 210. Thus, it may be appreciated that the wiring rail 370 may deter or prevent damage to the wiring 340 that may lead to inoperability of the light 260.

It may be appreciated that by integrating the lens 260a and the light emitter 260b into the integrally formed component 240, the component 240 may prevent impact or drop damage to these components of the light 260, such as by limiting undesired movement between such components. In some embodiments, the nesting of the components of the light 260 into the light portion 310 of the component 240 may also ease assembly of the light 260, by reducing or eliminating the number of fasteners utilized to secure the components of the light 260, as well as by guiding the wiring 340 in a desired manner as the wiring 340 leaves the component 240.

It may be appreciated that tape measures having an integral component defining a finger brake and the tape mouth may also have the integral component further defining additional features of the tape measure. For example, as shown in FIGS. 9-12, a tape measure 400 may include a central component 410 sandwiched between a first housing portion 420 and a second housing portion 430. As shown, a tape blade 440 with hook 450 is selectively extendable from a mouth 460 defined by the component 410, and would be housed within the component 410 when not extended (e.g., wound around a reel and tape motor 465 as shown in the exploded view of FIG. 12). The tape blade 440 may be locked in a given position relative to the component 410 using a slide-lock 470. As shown, however, the component 410 further defines a finger brake opening 480 such that a user may slow or prevent retraction of the blade 440 into the central component 410 by clamping the blade 440 between their finger and the central component 410 or other structure within the tape measure 400.

As further shown, the first housing portion 420 and the second housing portion 430 may extend beyond the perimeter of the central component 410 in some embodiments, forming flanged regions thereof. As shown, in an embodiment a lanyard loop 490 may be formed extending between the flanged regions of the first housing portion 420 and the second housing portion 430. Such a lanyard loop may define a passage for a screw or other fastener to pass through to connect the first housing portion 420 and the second housing portion 430, to assist in securing the component 410 between the first housing portion 420 and the second housing portion 430. A gap 500 between the lanyard loop 490 and the central component 410 may permit a lanyard to be inserted and looped around the lanyard loop 490 in some such embodiments.

Figure 11:
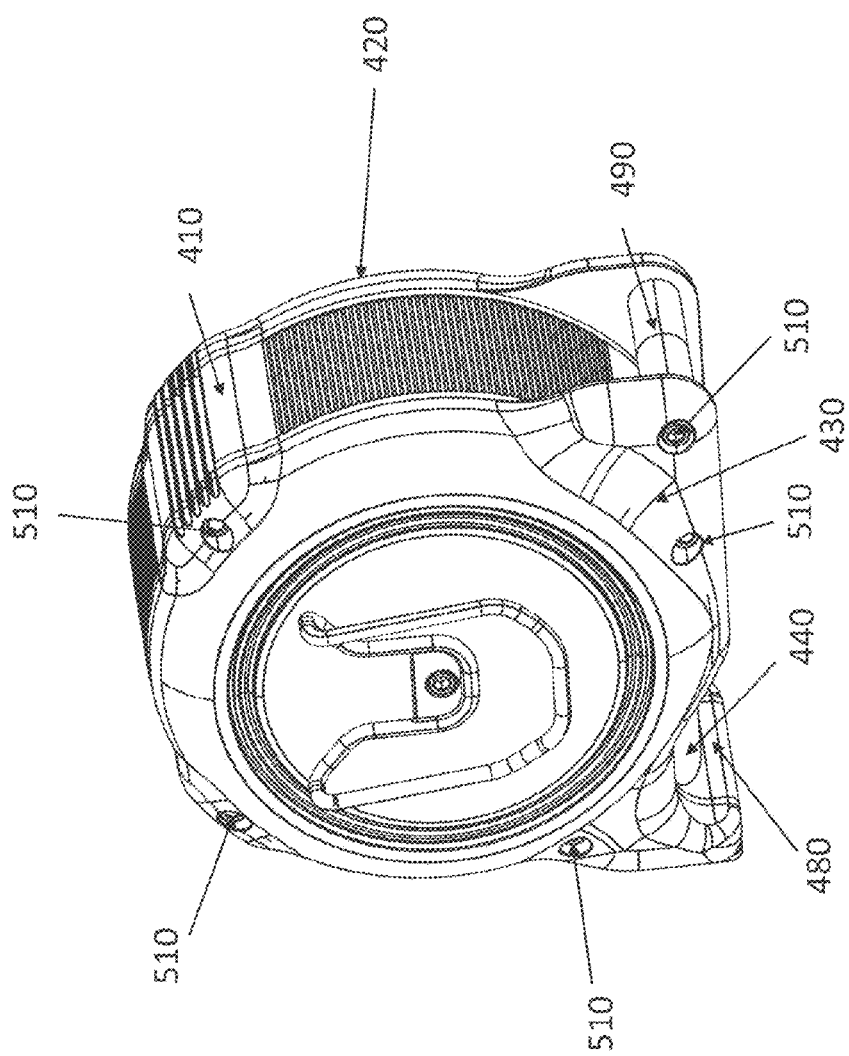
FIG. 11 illustrates a rear perspective view of the tape measure of FIG. 9.
Figure 12:
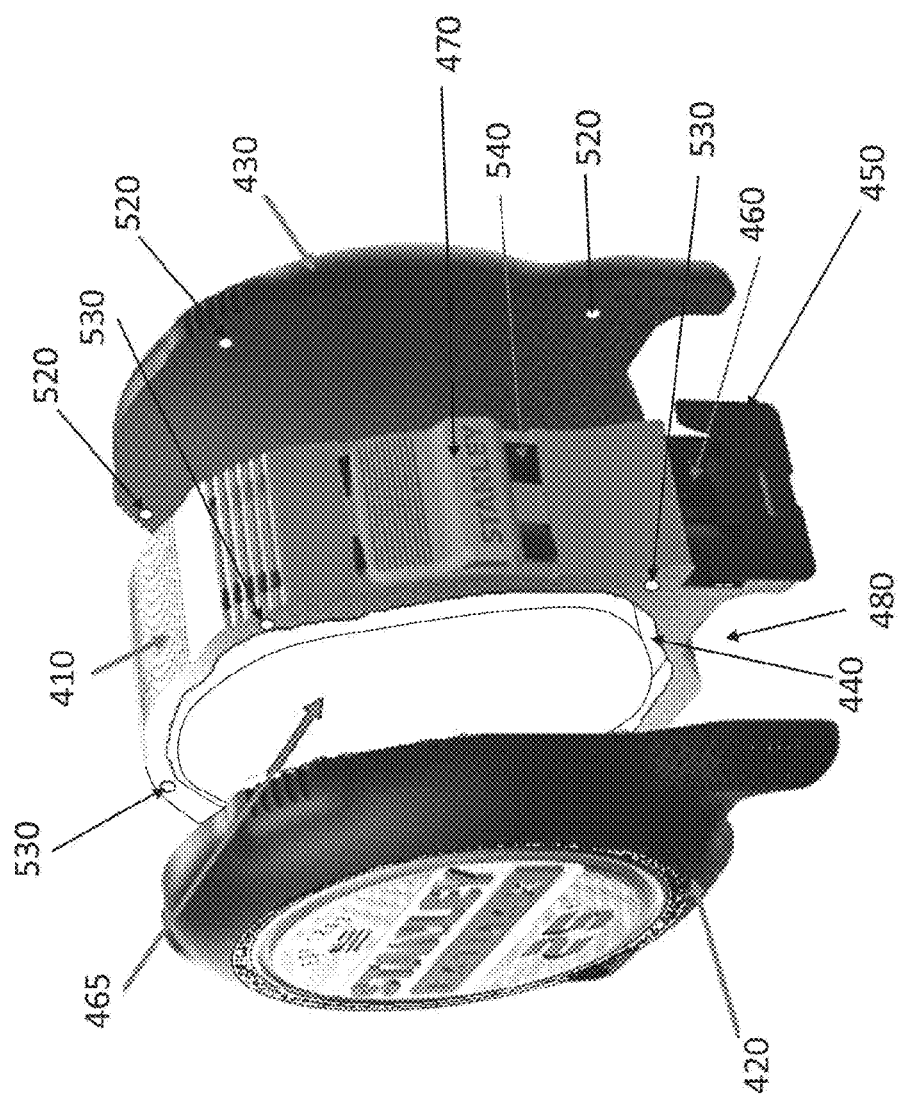
FIG. 12 illustrates an exploded perspective view of the tape measure of FIG. 9.

As may be seen more clearly in the rear view of FIG. 11, and appreciated with reference to the exploded view of FIG. 12, fasteners 510 may in some embodiments be inserted through the second housing portion 430, passing through apertures 520 in the second housing portion 430, through apertures 530 extending through the central component 410, and be received in the first housing component 420 so as to secure and sandwich the central component 410 between the first housing portion 420 and the second housing portion 430. In other embodiments, fasteners may be secured through each of the first housing component 420 and the second housing component 430, terminating in the central component 410. In still other embodiments, other mechanisms for securing the first housing portion 420 and the second housing portion 430 to the central component 410 may be utilized, including but not limited to snap fits, friction fits, adhesives, or so on.

As further shown in FIG. 12, structure of the central component 410 may be configured with apertures that facilitate an integral coupling between the mouth 450 the finger brake opening 480, and other features of the component 410 such that the component 410 encircles the reel and tape motor 465 (e.g., as an anulus). For example, as shown, the integral component 410 may include an aperture 540 with structure of the central component 410 on all sides, which may receive an actuator for the slide-lock 470. Similarly, structure of the central component 410 may surround the aperture defining the mouth 460, such that the tape blade 440 is constrained by the central component 410 to be accessible through the mouth 460 (e.g., to extend the blade therethrough) and the finger brake opening 480 (e.g., to allow selective slowing or locking of the blade by a user's finger). While the central component 410 may be seamless, it may be appreciated that it may be formed from an additive, transfer-molded, co-molded, or other such integrally creative process.

The objects, features, and characteristics of the present invention, as well as the methods of operation and functions of the related elements of structure and the combination of parts and economies of manufacture, may be apparent upon consideration of the description and drawings herein, all of which form a part of this specification. In one embodiment of the invention, the structural components illustrated herein are drawn to scale. It is to be expressly understood, however, that the drawings are for the purpose of illustration and description only and are not intended as a definition of the limits of the invention. In addition, it should be appreciated that structural features shown or described in any one embodiment herein can be used in other embodiments as well. As used herein, the singular form of "a", "an", and "the" include plural referents unless the context clearly dictates otherwise.

In various embodiments, tools and components thereof described herein may be formed of combinations of metal, plastic, ceramic, or any other appropriate material. It may be appreciated that the components described herein may be of different constructions or configurations, including but not limited to one or more being comprised of different material choices. For example, various components described herein may each be constructed from a variety of materials, including but not limited to one or more of fabrics, plastics, metals, rubbers, elastomers, or any other appropriate material choice, such as aluminum (e.g., machined aluminum), iron (e.g., steel), ceramic, or any other appropriate material. In addition to the components disclosed above, portions of tools leveraging the above teachings may be formed from molded or 3D printed plastic, metal, or combinations thereof (e.g., plastic with metal supports or fasteners coupling portions tougher). In some embodiments, structural and functional components may be formed from metal or hard plastic, while exterior-most gripped components positioned to engage the palm of a gripping hand to provide the palm with a comfortable gripping surface may be made of a suitable molded plastic material or elastomeric material, and may be generally formed as a bi-material suitable molded plastic material coated with a layer of an elastomeric material, such as a rubber-based material. In some embodiments, the material choices may differ from component to component. In various embodiments, some components may be integrally formed together, while other components may be assembled by any appropriate mechanism, including but not limited to fastened, welded, snap-fit, friction fit, adhesive bonding, or other appropriate securements.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of inventions more specifically understood in the context of the above disclosure.

What is claimed is:

1. A tape measure comprising:
  a housing comprising a first housing portion and a second housing portion;
  a reel configured to be secured between the first housing portion and the second housing portion, the reel containing a tape blade wound thereon and partially extending therefrom, the tape blade terminating in a hook portion;
  an integral component coupled to the first housing portion and the second housing portion, the integral component including an aperture defining a finger brake, the finger brake exposing the tape blade for engagement by a user;
  wherein the tape blade is biased to retract into the housing and wind around the reel, such that in a fully retracted position the hook portion abuts the portion of a mouth of the tape measure;
  wherein in an extended position the tape blade is unwound from the reel such that the hook extends away from the integral component; and
  wherein the integral component includes a first slot shaped to receive a light emitter.

2. The tape measure of claim 1, wherein the integral component further defines at least a portion of the mouth of the tape measure.

3. The tape measure of claim 1, wherein the integral component includes a second slot shaped to receive a lens for the light emitter.

4. The tape measure of claim 3, wherein one or more of the lens and the light emitter is configured to direct light from the light emitter onto the tape blade when the tape blade is the extended position.

5. The tape measure of claim 1, wherein the integral component includes an aperture facing an interior of the housing to facilitate wiring between a battery and the light emitter.

6. The tape measure of claim 5, wherein a switch to activate the light emitter is coupled to the light emitter by the wiring extending through the aperture facing the interior of the housing.

7. A tape measure comprising:
   a housing comprising a first housing portion and a second housing portion;
   a reel configured to be secured between the first housing portion and the second housing portion, the reel containing a tape blade wound thereon and partially extending therefrom, the tape blade terminating in a hook portion;
   an integral component coupled to the first housing portion and the second housing portion, the integral component including an aperture defining a finger brake, the finger brake exposing the tape blade for engagement by a user;
   wherein the tape blade is biased to retract into the housing and wind around the reel, such that in a fully retracted position the hook portion abuts the portion of a mouth of the tape measure;
   wherein in an extended position the tape blade is unwound from the reel such that the hook extends away from the integral component;
   wherein the integral component further defines at least a portion of the mouth of the tape measure; and
   wherein the integral component comprises a recess adjacent to the mouth to receive a rivet securing the hook to the tape blade.

8. The tape measure of claim 7, wherein the integral component includes an aperture defining an entirety of the mouth of the tape measure.

9. The tape measure of claim 7, wherein the integral component includes an aperture configured to receive a portion of a slide-lock.

10. The tape measure of claim 9, wherein the integral component generally separates the first housing portion and the second housing portion.

11. The tape measure of claim 7, wherein the integral component encircles the reel.

12. The tape measure of claim 7, wherein the integral component is formed from one of a cast, stamped, molded or 3D printed metal.

13. The tape measure of claim 7, wherein the integral component is formed of zinc.

14. The tape measure of claim 7, wherein the integral component comprises integrally formed mounting features configured to engage with reciprocal mounting features on one or more of the first housing portion and the second housing portion.

15. The tape measure of claim 7, wherein the integral component comprises integrally formed blade guide features configured to match a contour of the blade.

16. A tape measure comprising:
   a housing comprising a first housing portion and a second housing portion;
   a reel configured to be secured between the first housing portion and the second housing portion, the reel containing a tape blade wound thereon and partially extending therefrom, the tape blade terminating in a hook portion;
   an integral component coupled to the first housing portion and the second housing portion, the integral component including an aperture defining a finger brake, the finger brake exposing the tape blade for engagement by a user;
   wherein the tape blade is biased to retract into the housing and wind around the reel, such that in a fully retracted position the hook portion abuts the portion of a mouth of the tape measure;
   wherein in an extended position the tape blade is unwound from the reel such that the hook extends away from the integral component;
   wherein the integral component further defines at least a portion of the mouth of the tape measure; and
   wherein the portion of the mouth defined by the integral component is reinforced to act as a wear plate.

* * * * *